United States Patent
Cassia et al.

[11] Patent Number: 5,987,068
[45] Date of Patent: Nov. 16, 1999

[54] METHOD AND APPARATUS FOR ENHANCED COMMUNICATION CAPABILITY WHILE MAINTAINING STANDARD CHANNEL MODULATION COMPATIBILITY

[75] Inventors: Simon Hugh Cassia, Chandlers Ford; Andrew John Aftelak, Thatcham, both of United Kingdom; Boon Tiong Tan, Kent Ridge, Singapore; Kwan Yee Lee, Basingstoke, United Kingdom

[73] Assignee: Motorola, Inc., Schaumburg, Ill.

[21] Appl. No.: 08/744,913

[22] Filed: Nov. 8, 1996

[30] Foreign Application Priority Data

Nov. 10, 1995 [GB] United Kingdom ................... 9523046

[51] Int. Cl.$^6$ .................................................. H04L 27/32
[52] U.S. Cl. ........................... 375/281; 375/283; 375/285; 375/308; 375/331; 455/501; 455/102; 455/132; 455/143; 329/316; 329/348; 332/108; 332/119; 332/151
[58] Field of Search ..................................... 375/283, 308, 375/330, 331, 280, 285, 281, 348, 350, 324, 219; 370/286, 292, 295; 332/103, 117, 108, 119, 151; 329/316, 348; 455/76, 501, 102, 132, 143

[56] References Cited

U.S. PATENT DOCUMENTS

| | | | |
|---|---|---|---|
| 4,211,996 | 7/1980 | Nakamura | 371/37.04 |
| 4,481,640 | 11/1984 | Chow et al. | 375/200 |
| 4,663,768 | 5/1987 | Ryu | 375/211 |
| 4,731,800 | 3/1988 | Motley et al. | 375/285 |
| 5,157,693 | 10/1992 | Lemersal, Jr. et al. | 375/308 |
| 5,222,103 | 6/1993 | Gross | 375/281 |
| 5,233,630 | 8/1993 | Wolf | 375/308 |

*Primary Examiner*—Amanda Le
*Attorney, Agent, or Firm*—Andrew S. Fuller

[57] ABSTRACT

In a radio communication system (100), enhanced communication capability is provided while maintaining standard channel modulation compatibility. At a transmitter (110, 200, 600), a first information signal is generated from data according to a predefined standard modulation scheme (212, 613). A second information signal is generated from data that provides supplemental information to the standard modulated data (213, 616). For transmission, the first and second information signals are combined into a composite signal (214, 619) that represents the first information signal when interpreted according to the predefined standard modulation scheme.

22 Claims, 7 Drawing Sheets

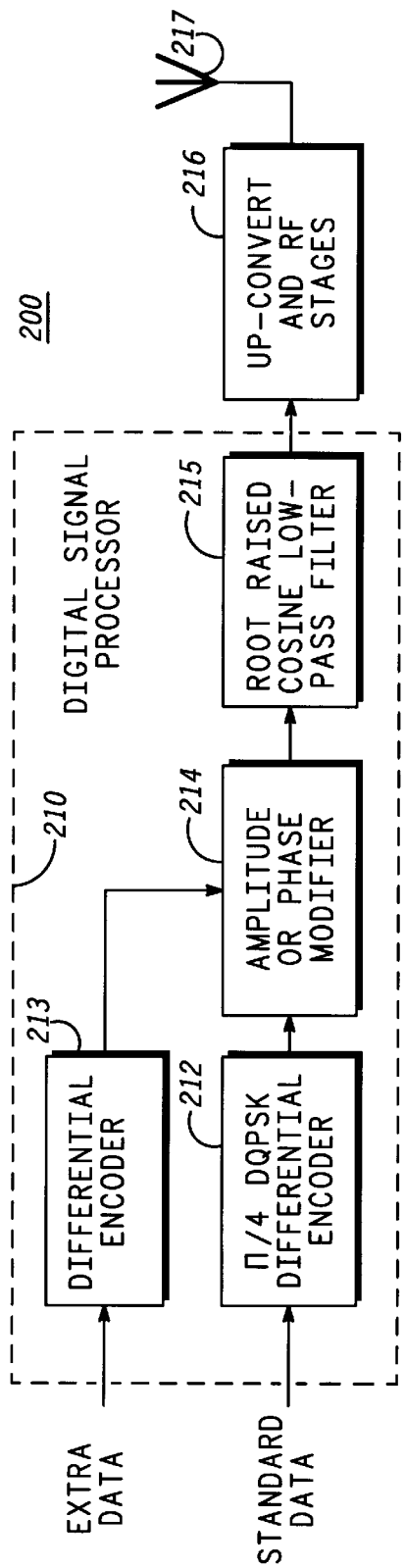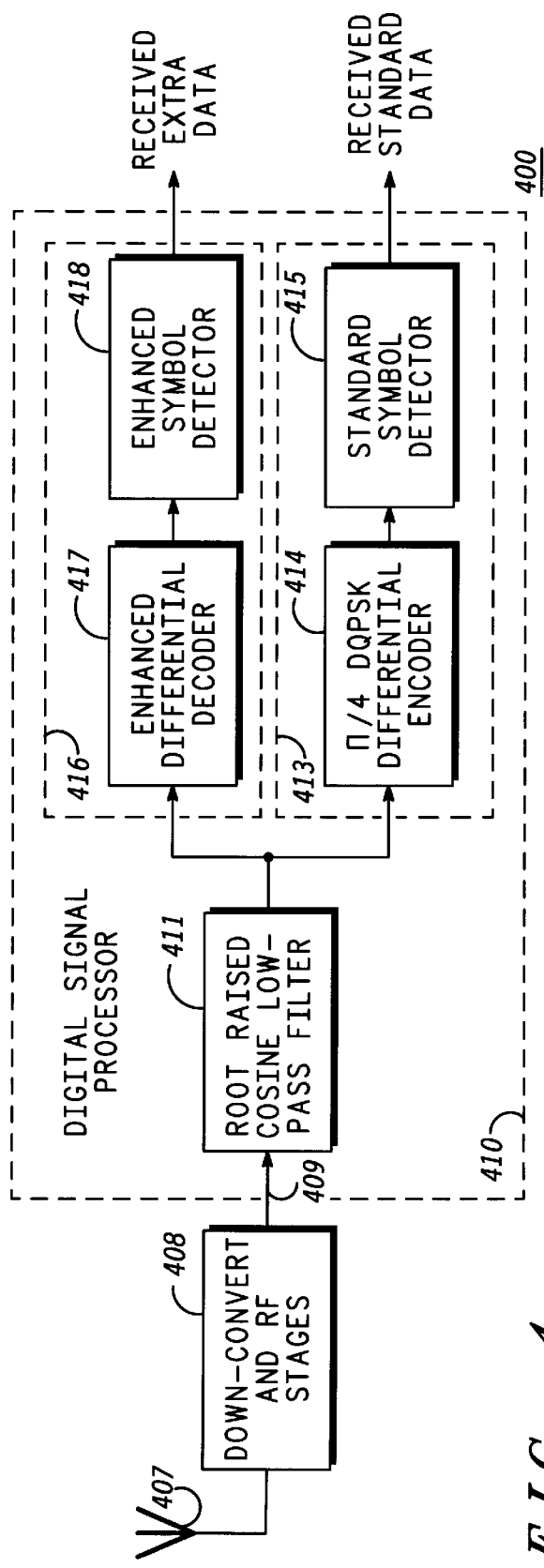
FIG. 2
FIG. 4

5,987,068

METHOD AND APPARATUS FOR ENHANCED COMMUNICATION CAPABILITY WHILE MAINTAINING STANDARD CHANNEL MODULATION COMPATIBILITY

TECHNICAL FIELD

This invention relates in general to communications systems, and particularly, communication systems having a standard channel modulation scheme and heterogeneous communication equipment.

BACKGROUND OF THE INVENTION

Radio communication systems have been traditionally proprietary in nature, typically involving a single manufacturer, or a limited set of manufacturers, that provide infrastructure and other communication equipment. Recently, there has been a move toward more open systems in which multiple manufacturers provide various components of the communication system. In an open communications system, heterogeneous communication equipment must be interoperable to be effective. To facilitate such interoperability, standards are usually established and promoted which govern interface specifications, communication protocol, and the like. Strict adherence to such standards are ordinarily necessary in order to effectively operate an open communication system.

Standards are established in a variety of ways. For example, a de facto standard may be established by long-standing practice, or by the practices of a dominant market player. More recently, there has been a trend toward standards establishing bodies, which may comprise government regulators and industry participants. A standard once established reflects compromises with respect to the state of technology. Various standards have been developed, and others are under consideration for two way radio communications systems. One well known prior art standard is the global system for mobile communication (GSM) standard for mobile phones. Benefits of such standards include the potential of lower cost to consumers from wider participation of various vendors, and wider availability of options.

In wireless radio frequency (RF) communication applications, one desirable standard is that of channel modulation. A channel modulation standard enables heterogeneous communication equipment to participate in radio communications. Once a particular channel modulation technique is chosen, this necessarily affects channel bandwidth, and consequently the quantity of information that may be transmitted over a given communication channel. Depending on the application, tradeoffs are often necessary when apportioning the channel bandwidth among data, error protection information, control information, and the like. For example, some applications, such as voice communication, may be real time in nature and therefore have different requirements than data communication that is not real time. Consequently, a channel modulation scheme is usually selected after evaluation of suitability for the information likely to be trafficked across a communication channel. Once a modulation scheme is selected and accepted as a standard, communication equipment participating in the radio communications system must adhere to the standard in order to maintain compatibility. This impacts the ability to provide enhanced communication capabilities through an increase in bandwidth, or other manipulation of communication parameters.

While standards provide substantial benefits to the consumer through lower cost and greater options, standards inherently reflect compromises in technology. For specific applications, the established standards might not directly support certain performance needs. Notably, a standard channel modulation scheme has a tendency to fix channel bandwidth which limits the opportunities to use additional information to improve communication. Yet, it is the standard channel modulation scheme that enables heterogeneous communication equipment to operate compatibly. Accordingly, it is desirable to provide a method and apparatus for enhanced communication capability while maintaining standard channel modulation compatibility.

SUMMARY OF THE INVENTION

These needs and others are substantially met through the provision of a method and apparatus for supporting enhanced communication capability in a radio communications system, while maintaining standard channel modulation compatibility. Pursuant to the present invention, a transmitter generates a first information signal from standard data according to a predefined standard modulation scheme. A second information signal is generated from data that provides supplemental information to the standard data. The second information signal is modulated time coincidentally with the first information signal. Both the first and second information signals are combined into a composite signal that represents the first information signal when interpreted according to the predefined standard modulation scheme. This composite signal is transmitted on a radio frequency communication channel.

BRIEF DESCRIPTION OF THE DRAWINGS

FIG. 2 is a block diagram of a transmitter apparatus that provides for enhanced communication capability while maintaining standard channel modulation compatibility, in accordance with the present invention.

FIG. 4 is a block diagram of a receiver that can process enhanced communication transmitted by the transmitter apparatus of FIG. 2, in accordance with the present invention.

DETAILED DESCRIPTION OF THE PREFERRED EMBODIMENT

Figure 1:
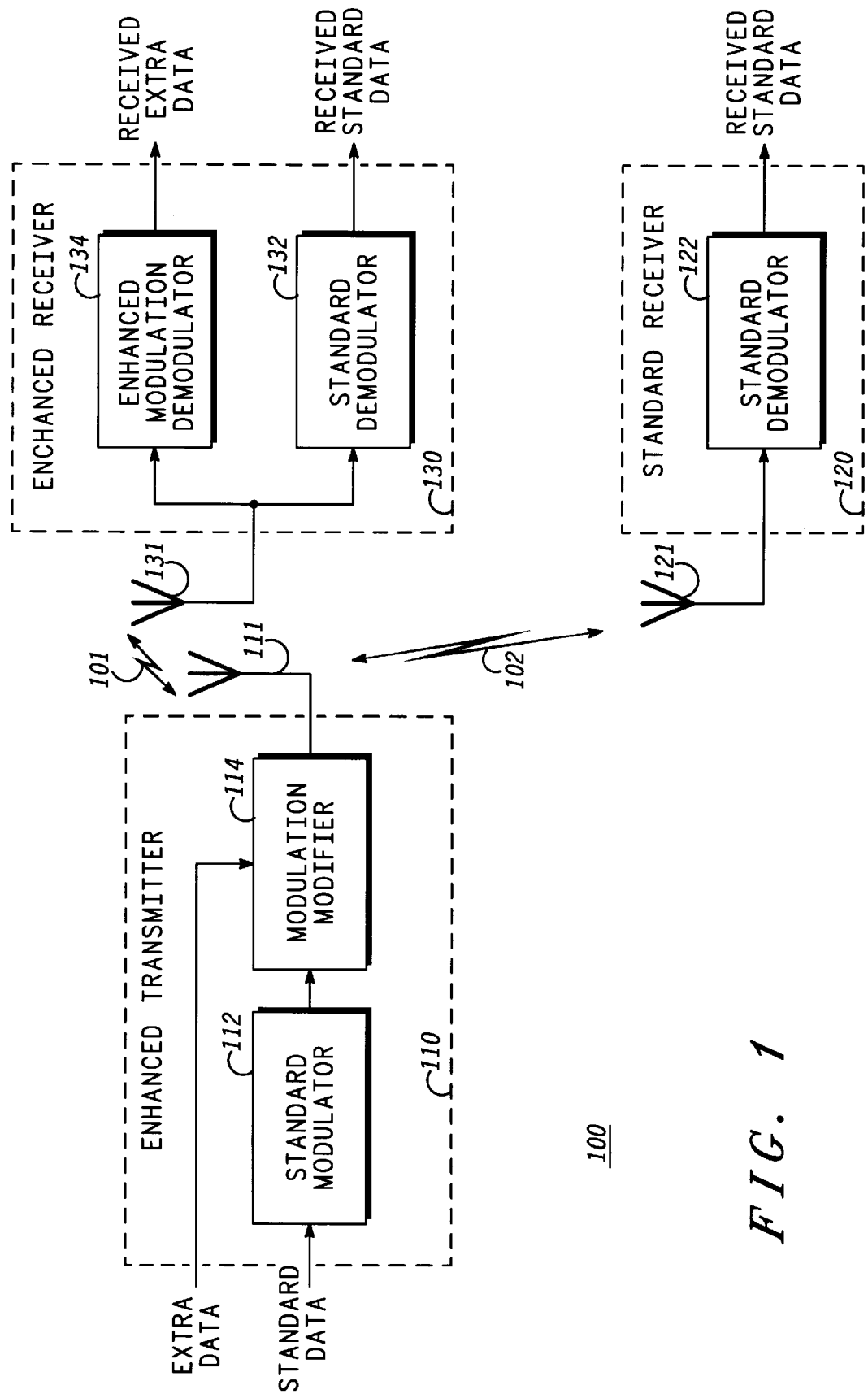
FIG. 1 is a block diagram of a communication system having heterogeneous communication equipment, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Generally, the present invention provides a method and apparatus for supporting enhanced communication capability in a radio communications system, while maintaining standard channel modulation compatibility. For standard communication, a transmitter generates a first information signal from data according to a predefined standard modulation scheme. Preferably, the first information signal represents data that would have ordinarily been transmitted without access to the enhanced communication capability of the present invention. For enhanced communications, a second information signal is generated from data that provides supplemental information to the standard data. Preferably, the second information signal is modulated time coincidentally with the first information signal. Both the first and second information signals are combined into a composite signal that represents the first information signal when interpreted according to the predefined standard modulation scheme. This composite signal is transmitted on a radio frequency communication channel. When a receiver that does not support enhanced communication capability receives the composite signal, it appears to that receiver as if the composite signal is a standard information signal according to the predefined modulation scheme. However, when an enhanced communication capable receiver processes the composite signal, the enhanced receiver separates the second information signal from the composite signal and retrieves the supplemental information.

Referring to FIG. 1, a block diagram is shown of a radio communication system 100 that supports enhanced communication capability while maintaining standard channel modulation compatibility, in accordance with the present invention. As shown, the radio communication system 100 includes an enhanced transmitter 110 that has established wireless communication links 101, 102, with heterogeneous communication equipment, including a standard receiver 120, and an enhanced communications capable receiver 130. In accordance with the present invention, the transmitter 110 provides for enhanced communications through modification of the standard channel modulation scheme. Accordingly, the enhanced transmitter 110 includes a standard modulator 112 to provide standard data, and a modulation modifier 114 to provide enhanced data capability.

As used herein, standard data or communication relates to data expected by a standard receiver and which is modulated according to the predefined standard modulation scheme. For example, in a communication to any receiver, whether or not capable of supporting enhanced communication, standard data is that expected data which would support normal communication operations as established by the communication protocol and modulation scheme defined for the radio communication system or portions thereof. Enhanced data or communication relates to supplementary or extra data, that although not necessary for normal communication operations, provide enhancement to the information supplied by the standard data.

In the preferred embodiment, the standard data comprises encoded speech parameters. The composition of the speech parameters transmitted is affected by the time constraints imposed by real time voice applications, and the bandwidth corresponding to the channel modulation scheme employed on a particular communication channel. Generally, for limited bandwidth environments, compromises are made that balance delays for the transmitted speech and speech quality. Preferably, the supplementary data comprises speech parameters that support enhancement of the encoded speech present in the standard data. Alternatively, the supplementary data comprises error mitigation information for the standard data, such as error detection and or correction information.

The standard modulator 112 modulates an information signal, from a symbol set representing data encoded for channel transmission, onto a carrier signal for transmission over a communication channel, such as a radio frequency channel, via antenna 111. The information signal is modulated according to the predefined modulation scheme which has been established as a standard for the radio communication system 100. In the preferred embodiment, the standard modulation scheme is based on $\pi/4$ Differential Quadrature Phase Shift Keying (DQPSK).

The modulation modifier 114 modifies the standard modulated signal to include supplementary data without significantly affecting the ability of a receiver to receive and interpret the standard data according to the pre defined modulation scheme. Various embodiments of the combination of standard modulator and modulation modifier are described in more detail below.

A standard demodulator 122 within the standard receiver 120 provides support for standard communication signals received via an antenna 121 according to the predefined modulation scheme. The enhanced receiver 130 is compatible with both standard and enhanced communication signals from the transmitter 110 via antenna 131. Accordingly, the enhanced receiver 130 includes a standard demodulator 132 and an enhanced modulation demodulator 134. As in the receiver 120, the demodulator 132 processes standard communication signals. The enhanced modulation demodulator 134 processes supplementary data modulated together with the standard signals. The enhanced receiver 130 of the preferred embodiment is further described below.

Referring to FIG. 2, a block diagram is shown of a first embodiment of a transmitter 200 with enhanced modulation capability, in accordance with the present invention. To support the predefined standard modulation scheme of the preferred embodiment, the transmitter 200 includes a $\pi/4$ DQPSK modulator coupled to a differential encoder that encodes the standard data. As is well known in the art, a $\pi/4$ DQPSK modulator produces a modulated signal having a constellation corresponding to predefined parameters. A differential encoder 213 is also included to encode data supplementing the standard data to provide enhanced communication. According to this embodiment of the present invention, the transmitter includes an amplitude modifier, or alternatively, a phase modifier 214 that modulates the supplementary data onto the information signal corresponding to the standard data. The amplitude/phase modifier 214 produces a composite signal that represents the modulation of both the standard data and the supplementary data. A root raised cosine low-pass filter 215 is coupled to the amplitude/phase modifier 214 and performs the function of limiting the bandwidth of the signal to that specified by the standard. The output of the root raised cosine low pass filter 215 is coupled additional RF stages 216 for up conversion and the like, and for ultimately transmission through an antenna 217. Preferably, the encoders 213, 212, amplitude/phase modifier 214, and low-pass filter 215, are all implemented through a digital signal processor (DSP) 210.

Figure 3:
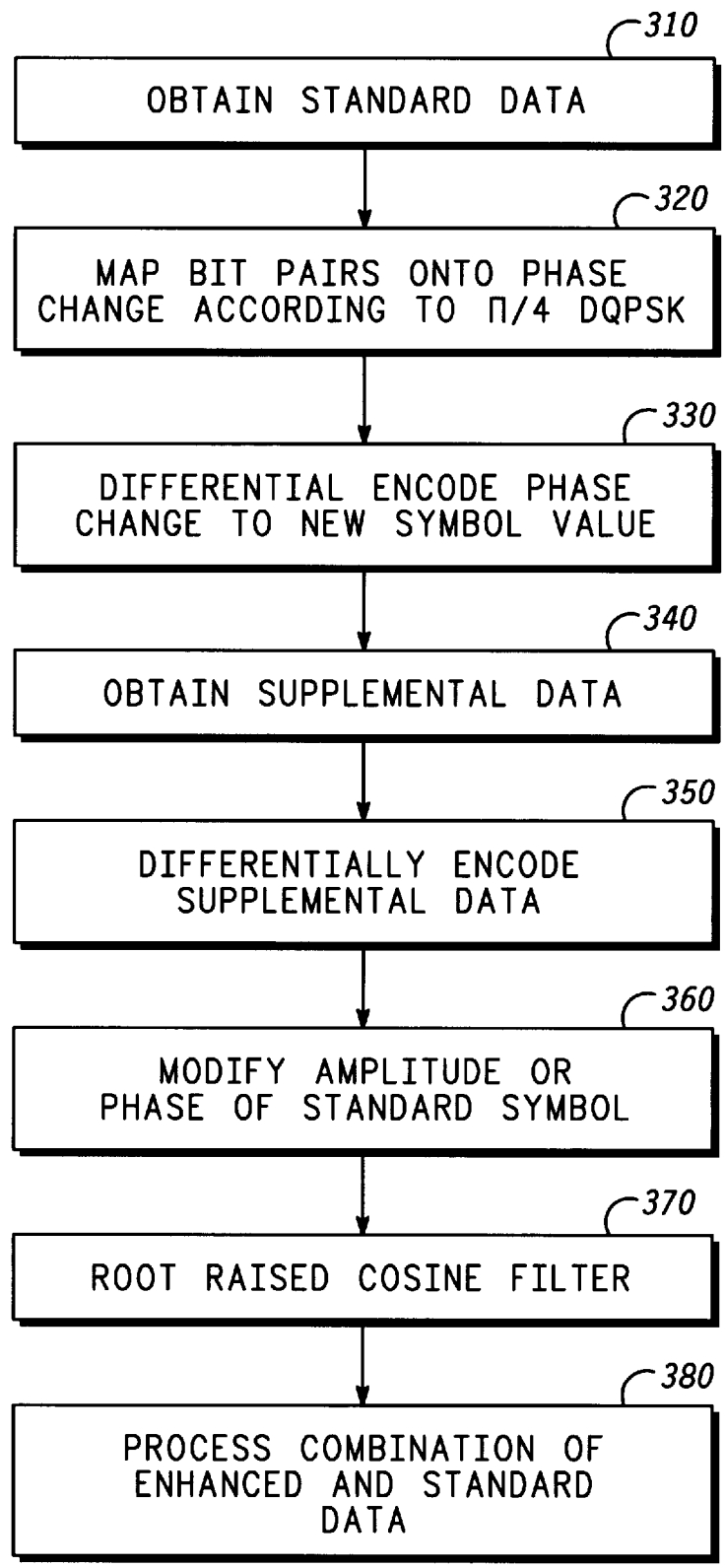
FIG. 3 is a flow chart of procedures showing operation of the transmitter apparatus of FIG. 2, in accordance with the present invention.

FIG. 3 is a flow chart of procedures describing operation of the transmitter of FIG. 2 in a preferred embodiment of the present invention. Referring to FIGS. 2 and 3, at the transmitter 200, a first information signal is generated from standard data according to the predefined standard modulation scheme, steps 310, 320, 330. Standard data is obtained, step 310. Bit pairs representing the standard data are mapped onto phase changes according to π/4 DQPSK modulation, step 320, which are differentially encoded to corresponding symbol values, step 330, by the differential encoder 212. Accordingly, the first information signal may be modulated on at least one carrier signal using π/4 DQPSK, or may remain as a baseband signal.

A second information signal is generated from data that provides supplemental information to the standard data, steps 340, 350, 360, 370. This second information signal is modulated time coincidentally with the first information signal. The supplemental data is obtained, step 340, and differentially encoded by encoder 213, step 350. The second information signal is modulated onto the first information signal through phase or amplitude modulation, step 360, using the amplitude/phase modifier 214, either by operating on the carrier modulated by the first information signal or on the baseband signal. Thus in one embodiment, the second information signal is modulated by using a phase modifier 214 to vary phase of the first information signal. In an other embodiment, the second information signal is modulated using an amplitude modifier 214 to vary amplitude of the first information signal.

According to the present invention, the first and second information signals, representing the standard data and enhanced data respectively, are combined into a composite signal that represents the first information signal when interpreted according to the predefined standard modulation scheme. Thus, the second information signal is superimposed or modulated on the first informational signal so as not to substantially interfere with the interpretation of the first information signal within permissible variations of the first information signal. Once the composite signal is generated, it is filtered through the root raised cosine filter 215, step 370, that performs a matched filtering function for optimum detector performance. Additional RF processing is then performed on the signal before it is transmitted through an antenna, step 380.

FIG. 4 is a block diagram of a receiver 400 that is compatible with enhanced modulation communication of the transmitter of FIG. 2, in accordance with the present invention. An antenna 407, couples a received signal to RF stages 408, for down conversion and the like, to recover a modulated signal 409. The modulated signal 409 is coupled to a root raised cosine low-pass filter 411. The output of the low-pass filter 411 is coupled to a standard demodulation block 413, and an enhanced demodulation block 416. The standard demodulation block 413 preferably includes a π/4 DQPSK differential decoder 414 coupled to a standard Quadrature Phase Shift Keying (QPSK).symbol detector 415. The π/4 DQPSK differential decoder 414 corresponds to the encoder used for transmission. The enhanced demodulation block 416 preferably includes an enhanced differential decoder 417 that is coupled to an enhanced symbol detector 418. In the preferred embodiment, the filter 411, and the standard and enhanced demodulation blocks 413, 416, are implemented through a DSP 410.

Figure 5:
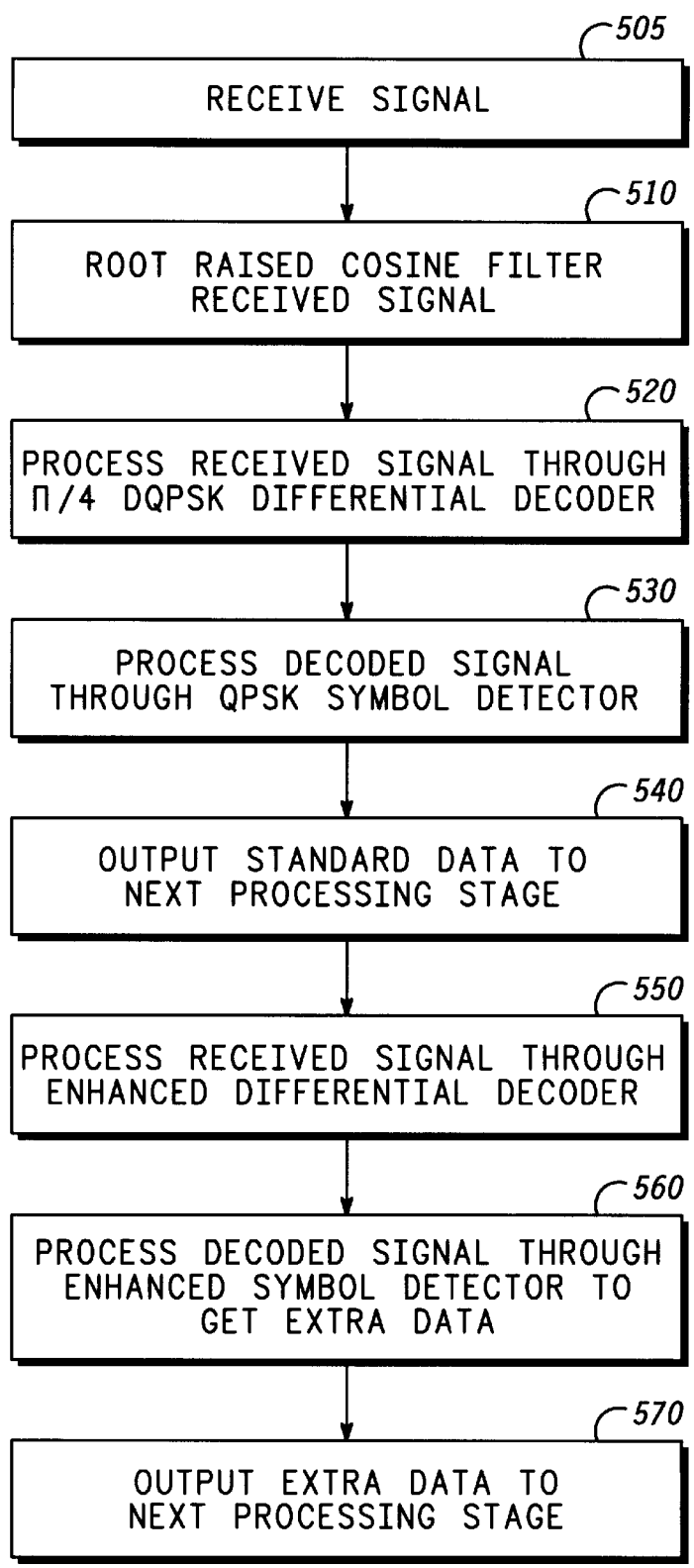
FIG. 5 is a flow chart of procedures showing operation of the receiver of FIG. 4, in accordance with the present invention.

FIG. 5 is a flow chart of procedures showing operation of the receiver of FIG. 4 in a preferred embodiment of the present invention. Referring to FIGS. 4 and 5, at the receiver 400, the composite signal is received and processed through down conversion and RF stages 408, step 505. Both the standard data, and the enhanced data, are recovered from the composite signal. The composite signal is first filtered with the root raised cosine low pass filter 411 to provide a filtered signal, step 510. For the standard data, the filtered signal is decoded using the π/4 DQPSK differential decoder 414, step 520. Standard data symbols are then generated with the QPSK symbol detector 415, step 530, and made available for further data processing, step 540. To extract the enhanced data, the filtered composite signal is decoded using the differential decoder 417 corresponding to the enhanced data, step 550, and the decoded signal fed through the symbol detector 418 that generates the enhanced, or supplementary data, step 560. The supplementary data is then made available for further data processing, step 570.

Figure 6:
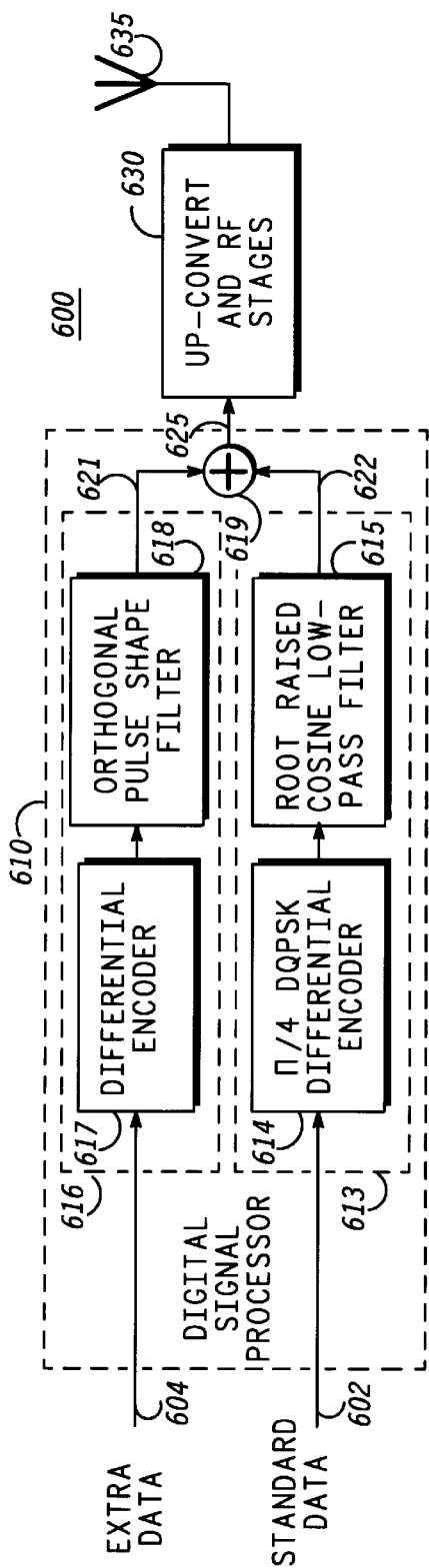
FIG. 6 is a block diagram showing a second embodiment of the transmitter apparatus with enhanced communication capability that maintains standard channel modulation compatibility, in accordance with the present invention.

FIG. 6 is a block diagram of a transmitter apparatus 600 of a second embodiment, in accordance with the present invention. The transmitter 600 provides enhanced communication capability modulating supplementary data using an pulse shape signal orthogonal to the standard data signal. In the transmitter 600, a standard modulation block 613 is coupled to standard data 602. The standard modulation block 613 includes a π/4 DQPSK differential encoder 614 coupled to a root raised cosine low pass filter 615. The enhanced modulation block 616 is coupled to supplementary data 604, and includes a differential encoder 617 coupled to an orthogonal pulse shape filter 618. Signals 621, 622 from the standard modulation block 613 and the enhanced modulation block 616, are coupled to a combiner 619 that produces a composite signal 625. The composite signal 625 is coupled to RF stages 630 for up conversion and the like. An antenna 635 is coupled to the RF stages 630.

Figure 7:
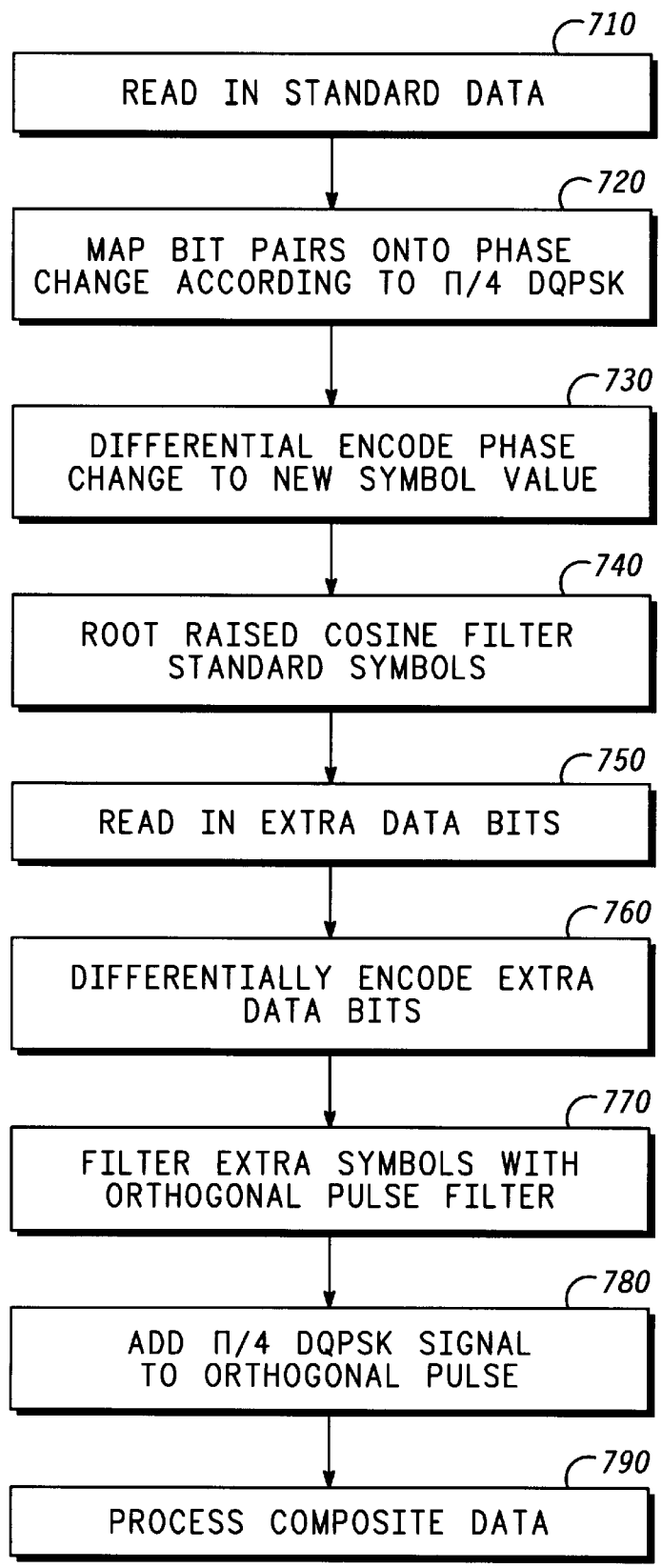
FIG. 7 is a flow chart of procedures showing operation of the transmitter apparatus of FIG. 6, in accordance with the present invention.

FIG. 7 is a flow chart of procedures for operation of the transmitter apparatus of FIG. 6 in a preferred embodiment of the present invention. Referring to FIGS. 6 and 7, the standard modulation block 613 is used to generate a first information signal from standard data, according to the predefined standard modulation scheme, steps 710, 720, 730, 740. The standard data is obtained, step 710, preferably in digital form comprising of bit pairs. The bit pairs are mapped onto phase changes of at least one carrier signal, step 720. Preferably, the standard data is mapped according to π/4 DQPSK modulation. The resultant phase change signals are differentially encoded to particular symbol values representing the standard data, and these symbols are filtered with the root raised cosine filter 615. Thus, a modulated first information signal is provided by modulating the standard data using π/4 DQPSK, and the modulated standard information signal is filtered using the raised cosine low pass filter 615 to provide a filtered modulated information signal.

Using the enhanced modulation block 616, a second information signal corresponding to the supplementary data is modulated or superimposed substantially orthogonal to the first information signal, steps 750, 760, 770, 780. The supplementary data is obtained, step 750, and differentially encoded, step 760. The resultant signal is filtered with the orthogonal pulse shape filter 618. Thus, the second information signal is modulated using an orthogonal pulse shape filter to provide a filtered modulation second information signal substantially orthogonal to, and time coincidental with, the filtered modulated first information signal. Both signals are combined to produce a composite signal, by adding the π/4 DQPSK signal to the orthogonal pulse signal, step 780. The resulting signal is then further processed for transmission over a communication channel, step 790.

Figure 8:
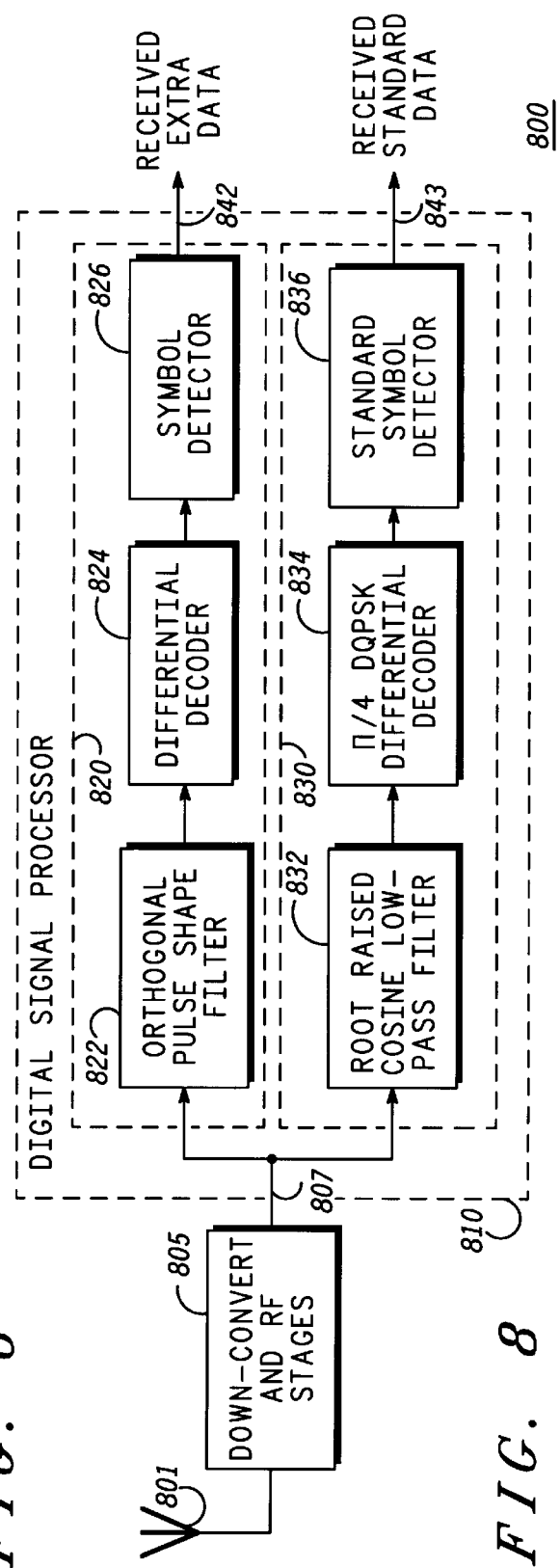
FIG. 8 is a block diagram of a receiver apparatus that is compatible with the transmitter apparatus of FIG. 6, in accordance with the present invention.

FIG. 8 shows a block diagram of a receiver 800 capable of processing enhanced communications from the transmitter apparatus of FIG. 6, in accordance with the present invention. The receiver 800 includes an antenna 801 coupled to down convert and RF stages 805, for down conversion and the like, to ultimately provide a received signal 807. The received signal 807 is coupled to a standard demodulation block 830, and an enhanced demodulation block 820. The standard demodulation block 830 includes a root raised cosine low pass filter 832 coupled to a π/4 DQPSK differential decoder 834, which in turn is coupled to a standard symbol detector 836. The standard demodulation block 830 produces decoded data symbols 843 corresponding to standard data. The enhanced demodulation block 820 includes an orthogonal pulse shape filter 822 coupled to a differential decoder 824, which in turn is coupled to a symbol detector 826. The enhanced demodulation block 820 produces supplementary data 842 recovered from the enhanced modulation portion of the received composite signal 807.

Figure 9:
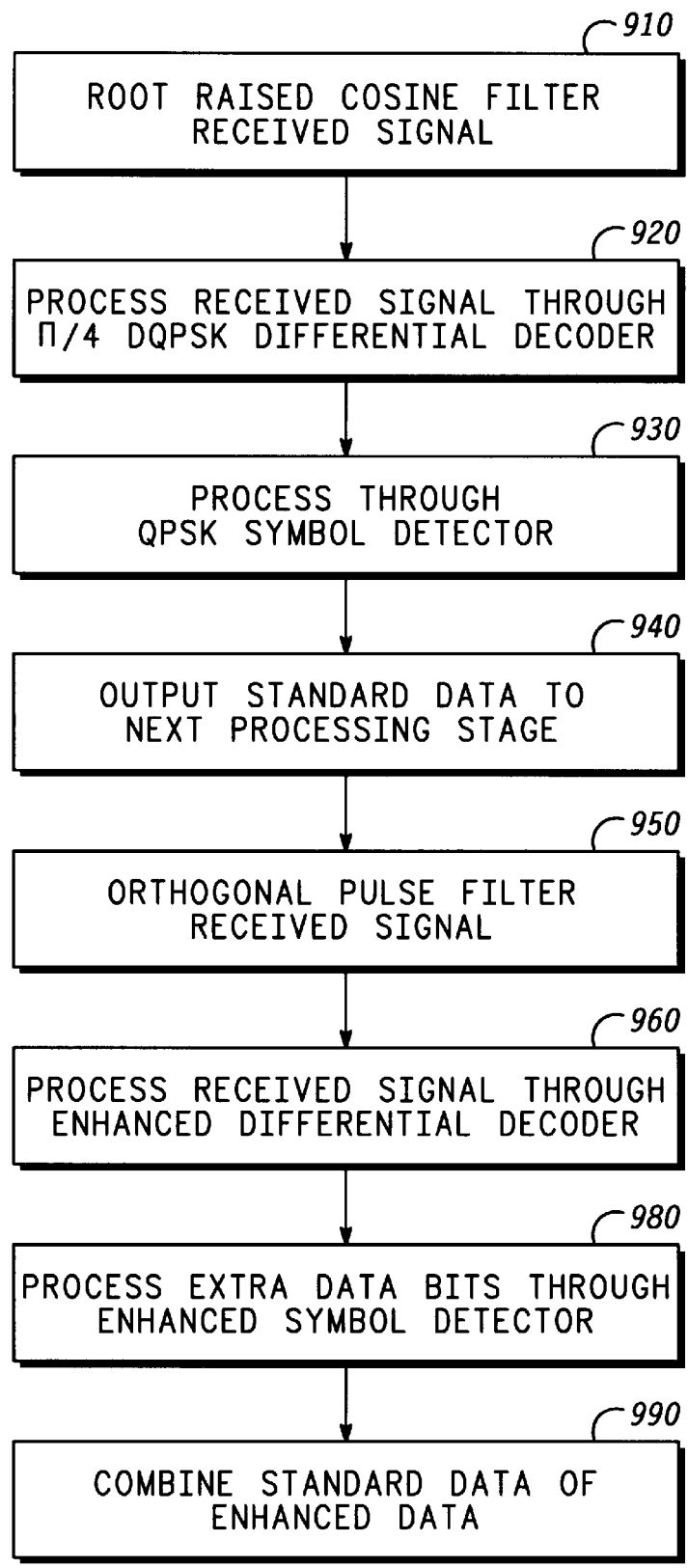
FIG. 9 is a flow chart of procedures showing operation of the receiver apparatus of FIG. 8, in accordance with the present invention.

FIG. 9 shows a flow chart of procedures describing the operation of the receiver of FIG. 8 in a preferred embodiment of the present invention. Referring to FIGS. 8 and 9, a composite signal comprising standard data and supplementary data is received at the receiver 800. The standard data is then recovered from the composite signal, steps 910, 920, 930. The received composite signal is filtered by the root raised cosine filter 832, step 910. The filtered composite signal is decoded using the π/4 DQPSK differential decoder 834, step 920. The QPSK symbol detector 836 is then used to extract or generate the standard data 843, step 930, which is output for further processing, step 940.

The supplementary enhanced data is also recovered from the composite signal, steps 950, 960, 980. The received composite signal is filtered using the orthogonal pulse shape filter 822 to provide a filtered composite signal, step 950. The filtered composite signal is decoded with the differential decoder 824 that corresponds to the enhanced or supplementary data, step 960. The symbol detector 826 generates the supplementary data from the decoded and filtered composite signal, step 980. Preferably, the standard data and the supplementary data are combined to enhance the quality of information provided by the standard data, step 990.

The present invention provides significant benefits. An enhanced signal is used to provide standard and supplementary data to an enhanced communication capable receiver, and standard data to a standard communication capable receiver. Thus, enhanced communication capability can be offered while maintaining backwards compatibility in a radio communication system employing a standard modulation scheme to facilitate interoperability of heterogeneous communication equipment.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for providing enhanced communication capability in a radio communication system while maintaining standard channel modulation compatibility, the radio communication system having a standard receiver, an enhanced transmitter, and an enhanced receiver, and a predefined modulation scheme that completely defines a standard for communications among the transmitter and receivers, the method comprising the steps of:

at the enhanced transmitter:
generating a first information signal from first data according to the predefined modulation scheme;
generating a second information signal from second data that provides supplemental information to the first data, wherein the second information signal is modulated time coincidentally with the first information signal;
combining the first and second information signal into a composite signal that represents only the first information signal when interpreted, according to the predefined modulation scheme, by the standard receiver, but that represents a combination of the first and second information signals when interpreted by the enhanced receiver; and
transmitting the composite signal on a radio frequency communication channel.

2. The method of claim 1, further characterized in that:
the step of generating a first information signal comprises the step of modulating the first information signal on at least one carrier signal; and
the step of combining comprises the step of modulating the second information signal using the first information signal as a carrier signal.

3. The method of claim 2, further characterized in that the step of modulating the first information signal comprises
modulating the first information signal using π/4 differential quadrature phase shift keying (DQPSK).

4. The method of claim 3, further characterized in that the step of modulating the second information signal comprises
modulating the second information signal using an amplitude modifier applied to the first information signal.

5. The method of claim 3, further characterized in that the step of modulating the second information signal comprises
modulating the second information signal using a phase modifier applied to the first information signal.

6. The method of claim 3, further characterized by the step of, at the transmitter,
filtering the composite signal with a root raised cosine low-pass filter before the step of transmitting.

7. The method of claim 1, further characterized in that:
the step of generating a second information signal comprises the step of
modulating the second information signal substantially orthogonal to the first information signal.

8. The method of claim 1, further characterized in that:
the step of generating a first information signal comprises the steps of:
modulating the first information signal using π/4 differential quadrature phase shift keying (DQPSK) to provide a modulated first information signal;
filtering the modulated first information signal using a root raised cosine low-pass filter to provide a filtered modulated first information signal;
the step of generating a second information signal comprises the step of
modulating the second information signal using an orthogonal pulse shape filter to provide a filtered modulated second information signal substantially orthogonal to the filtered modulated first information signal; and
the step of combining comprises the step of
combining the filtered modulated first information signal with the filtered modulated second information signal to produce the composite signal.

9. The method of claim 8, further characterized in that:
the step of modulating the first information signal comprises the steps of:
mapping bit pairs representing the first data onto phase changes of the at least one carrier signal according to π/4 DQPSK modulation;

differentially encoding the phase changes to a particular symbol value; and the step of modulating the second information signal comprises the step of:

differentially encoding data bits representing the supplemental information.

10. The method of claim 1, further characterized by the steps of:

at the enhanced receiver:
receiving the composite signal;
recovering the first data from the composite signal;
recovering the second data from the composite signal; and
combining the second data with the first data to enhance quality of information provided by the first data.

11. The method of claim 10, further characterized in that:
the step of recovering the first data comprises the steps of:
filtering the composite signal using root raised cosine low-pass filtering to provide a first filtered composite signal;
decoding the first filtered composite signal with a $\pi/4$ DQPSK differential decoder;
generating the first data with a first symbol detector;
the step of recovering the second data comprises the steps of:
filtering the composite signal using root raised cosine low-pass filtering to provide a second filtered composite signal;
decoding he second filtered composite signal with a differential decoder;
generating the second data from the second filtered composite signal with a second symbol detector.

12. The method of claim 10, further characterized in that:
the step of recovering the first data comprises the steps of:
filtering the composite signal using root raised cosine low-pass filtering to provide a first filtered composite signal;
decoding the first filtered composite signal with a $\pi/4$ DQPSK differential decoder;
generating the first data with a first symbol detector;
the step of recovering the second data comprises the steps of:
filtering the composite signal with an orthogonal pulse shape filter to provide a second filtered composite signal;
decoding the second filtered composite signal with a differential decoder;
generating the second data from the second filtered composite signal with a second symbol detector.

13. The method of claim 10, further characterized in that the first data comprises encoded speech.

14. The method of claim 13, further characterized in that the second data comprises speech parameters that support enhancement of the encoded speech.

15. The method of claim 10 or 13, further characterized in that the second data comprises error mitigation information for the first data.

16. A radio communication system having a plurality of transmitters and receivers, and providing for standard communications using a predefined channel modulation scheme among the plurality of transmitters and receivers, and for enhanced communications between selected units of the plurality of transmitters and receivers while maintaining standard channel modulation compatibility, the plurality of transmitters and receivers comprising:

a standard receiver;

an enhanced receiver; and an enhanced transmitter apparatus that provides a composite signal to the standard receiver and to the enhanced receiver, such that when interpreted by the standard receiver, the composite signal provides a standard set of information that is complete according to the predefined channel modulation scheme that governs communication among transmitters and receivers in the radio communication system, and when interpreted by the enhanced receiver, contains supplemental information not affecting the standard receiver but used by the enhanced receiver for enhanced communications, the transmitter apparatus, comprising:

means for modulating a first symbol set from first data to provide a first modulated signal according to the predefined channel modulation scheme; and means, coupled to said first modulated signal, for superimposing a second modulated signal from second data on said first modulated signal to provide the composite signal that represents the first modulated signal within permissible variation, according to the predefined channel modulation scheme, wherein the second data supplements the first data.

17. The radio communication system of claim 16, further characterized in that the means for modulating comprises a $\pi/4$ DQPSK differential encoder.

18. The radio communication system of claim 17, further characterized in that the means for superimposing comprises means for varying amplitude of the first modulated signal to modulate the second modulated signal.

19. The radio communication system of claim 17, further characterized in that the means for superimposing comprises means for varying phase of the first modulated signal to modulate the second modulated signal.

20. The radio communication system of claim 16, further characterized in that the means for superimposing comprises means for generating the second modulated signal orthogonal to, and time coincidental with, the first modulated signal.

21. The radio communication system of claim 20, wherein the transmitter apparatus further comprises:

apparatus for generating the second modulated signal, comprising:

differential encoder coupled to the second data and providing second encoded data;

an orthogonal pulse shape filter coupled to the second encoded data and providing second filtered data, wherein the second modulated signal is derived from the second filtered data; and wherein:

the means for modulating comprises:

a $\pi/4$ DQPSK differential encoder coupled to the first data and providing first encoded data in response to the first data;

a root raised cosine low-pass filter coupled to the first encoded data and providing first filtered data in response to the first encoded data, wherein the first modulated signal is derived from the first filtered data; and the means for superimposing comprises, a combiner coupled to the first modulated signal and to the second modulated signal and providing the composite signal as an output.

22. The radio communication system of claim 16, further characterized in that the second data comprises error mitigation information for the first data.

* * * * *